US010200485B2

(12) United States Patent
Marra et al.

(10) Patent No.: US 10,200,485 B2
(45) Date of Patent: Feb. 5, 2019

(54) PUSHING NEWS FEED CONTENT TO CLIENT DEVICES (71) Applicant: Facebook, Inc., Menlo Park, CA (US)

(72) Inventors: Christopher John Marra, San Francisco, CA (US); Alexander A. Sourov, Seattle, WA (US); Alexandru Petrescu, Shoreline, WA (US); Syed Shahbaz Ahmed, Redmond, WA (US); Lars Seren Backstrom, San Francisco, CA (US)

(73) Assignee: Facebook, Inc., Manlo Park, CA (US)

( * ) Notice: Subject to any disclaimer, the term of this patent is extended or adjusted under 35 U.S.C. 154(b) by 323 days.

(21) Appl. No.: 15/091,137

(22) Filed: Apr. 5, 2016

(65) Prior Publication Data
US 2017/0289288 A1  Oct. 5, 2017

(51) Int. Cl.
H04L 29/08 (2006.01)
G06F 17/30 (2006.01)
(52) U.S. Cl.
CPC ........ *H04L 67/26* (2013.01); *G06F 17/30867* (2013.01); *H04L 67/22* (2013.01); *H04L 67/306* (2013.01); *H04L 67/325* (2013.01)
(58) Field of Classification Search
None
See application file for complete search history.

(56) References Cited

U.S. PATENT DOCUMENTS

| | | | | |
|---|---|---|---|---|
| 8,214,619 B1* | 7/2012 | Connolly | ............ | G06F 13/1684 710/56 |
| 2012/0005203 A1* | 1/2012 | Brzozowski | ...... | G06F 17/30867 707/732 |
| 2013/0110978 A1* | 5/2013 | Gordon | .............. | H04N 21/2665 709/218 |
| 2014/0146177 A1* | 5/2014 | Pacor | ............... | H04N 21/21805 348/157 |
| 2015/0249715 A1* | 9/2015 | Helvik | .................... | H04L 67/22 709/204 |
| 2017/0142462 A1* | 5/2017 | Uhrich | ............... | H04N 21/2668 |
| 2017/0300597 A1* | 10/2017 | Moromisato | ..... | G06F 17/30994 |

\* cited by examiner

*Primary Examiner* — Natisha D Cox
(74) *Attorney, Agent, or Firm* — Fenwick & West LLP (57) ABSTRACT A system transmits selected news feed stories to a client device in advance of receiving a request for news feed stories. As a result, stories are immediately available for viewing when a user interacts with the system. The system selects news feed stories to push based on criteria such as a likelihood that a user will interact with a story and the sizes of pushed stories. For example, the system selects news feed stories such that a total size of stories selected does not exceed a threshold value based on local memory at the client device. The system may determine a scheduled time at which the stories are selected and pushed. The scheduled time is based on factors including patterns of network connection speed or past user interactions, for example, a time range of the day during which the user most frequently viewed pushed stories.

18 Claims, 6 Drawing Sheets

Receive news feed stories from a social networking system ranked for a user.
501

---

Identify one or more patterns describing interactions with news feed stories by the user on a client device of the user.
502

---

Identify one or more news feed stories to push to the client device based at least in part on the one or more patterns and predetermined rules.
503

---

Determine a scheduled time to select and push the identified one or more news feed stores based at least in part on the one or more trends.
504

---

Transmit, at the scheduled time, the identified one or more news feed stories from the social networking system to the client device.
505

FIG. 5

PUSHING NEWS FEED CONTENT TO CLIENT DEVICES

BACKGROUND

This disclosure relates to providing news feeds by social networking systems to a client device in general, and in particular to transmitting content of news feed stories by a social networking system to a client device in advance of receiving a request for news feed stories from the client device.

A social networking system has access to large amounts of information describing actions performed by users that may be interesting to other users of the social networking system. Users are often interested in learning about actions performed by other users connected to the user in the social networking system. These actions include photo and video uploads, status updates, transactions, wall posts, posting of comments, recommendations, likes indicated on other users' photos, videos, and the like. The social networking system stores other types of information that is likely to be of interest to the user, for example, activities related to social groups or events represented in the social networking system. The social networking system presents social information as news feed stories, also referred to herein as stories.

Stories are ranked by the social networking system in order of relevance or interest to a user. In response to a user requesting stories from the social networking system, the social networking system provides stories for presentation via a client device of the user. Users are increasingly accessing social networking systems using mobile client devices, for example, smart phones. Such devices often have memory and bandwidth constraints. For example, a mobile device may have good network bandwidth in certain locations and poor bandwidth in other locations. Furthermore, a mobile device may have multiple applications executing at any given time, thereby leaving a limited amount of memory for storing information received from the social networking system. Due to such memory and bandwidth constraints of these client devices, interactions of users with the social networking systems via these client devices are often poor. For example, users are required to wait for their stories to be retrieved from the social networking system. As a result, conventional techniques often provide poor user experiences to users attempting to interact with news feed stories using their client devices.

SUMMARY

Embodiments select news feed stories of a social networking system to be pushed to a client device of a user of the social networking system. Typically, news feed stories are provided to the client device when the social networking system receives a request from the client device for more news feed stories. To provide an improved user experience, the social networking system pushes, i.e., transmits the content of selected news feed stories to the client device in advance, i.e., before receiving a request from the client device. As a result, news feed stories are immediately available for viewing to the user when the user interacts with the social networking system via the client device.

The social networking system selects news feed stories to push to the client device based on criteria such as a measure of likelihood that a user will interact with a pushed story. In some embodiments, stories are selected for being pushed to the client devices based on sizes of pushed stories. For example, stories are selected for being pushed to the client device such that the total size of stories selected does not exceed a threshold value based on an amount of local memory allocated for storing the news feed stories on the client device.

In some embodiments, the social networking system determines a scheduled time at which the stories are selected and pushed to the client device. The scheduled time is determined so as to optimize the likelihood that the user accesses the stories soon after the stories are pushed to the client device. The scheduled time is determined based on factors including patterns of past interactions of the user with the social networking system, for example, a certain time range of the day during which the user most frequently viewed news feed stories in the past. In an embodiment, the scheduled time is based on patterns of network connection speed of the client device.

DETAILED DESCRIPTION

System Overview

Figure 1:
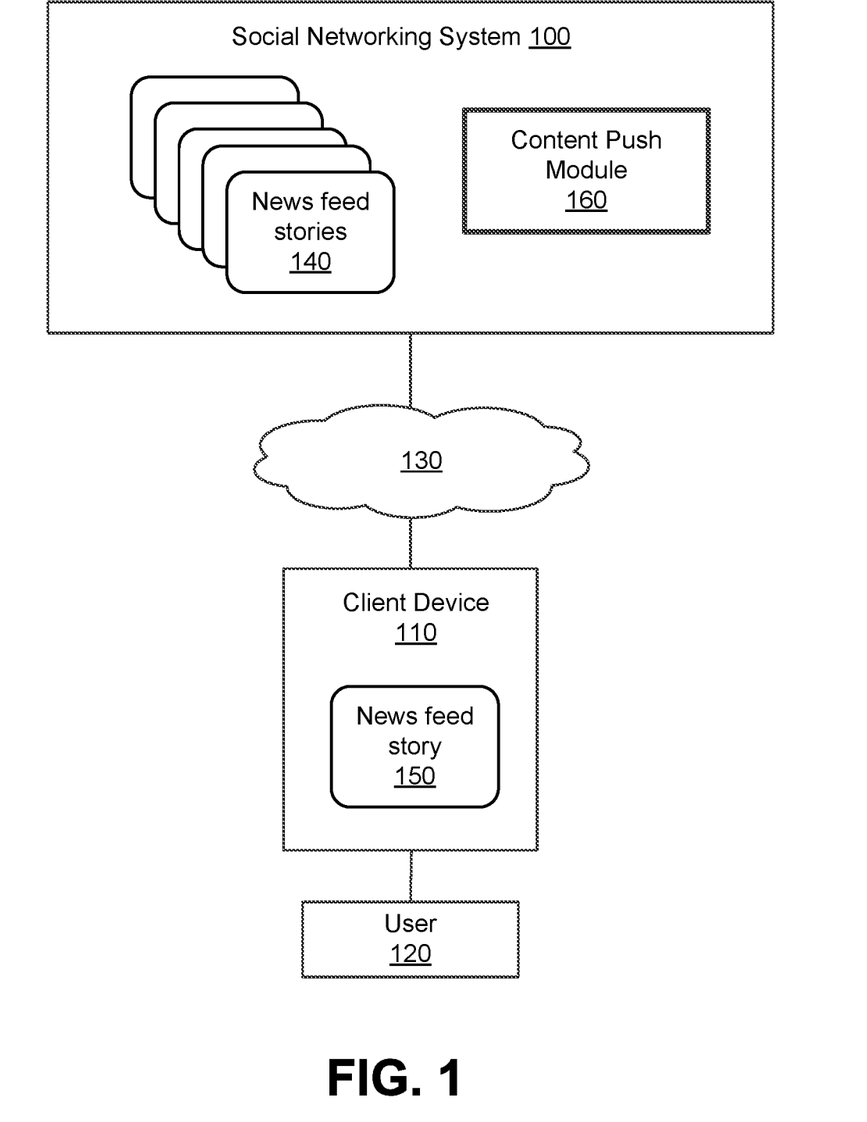
FIG. 1 is a block diagram of a system environment for pushing news feed stories to client devices of users of a social networking system according to one embodiment.

FIG. 1 is a block diagram of a system environment for pushing news feed stories to client devices of users of a social networking system according to one embodiment. In the embodiment shown in FIG. 1, the system environment comprises a social networking system 100 and client device 110 connected via the network 130. A news feed story 150 is presented on the client device 110 for a user 120 of the device to view, e.g., displayed in the news feed 200 further described in FIG. 2. Some embodiments of the system 100 include different and/or other modules than the ones described herein and have more than one client device 110 and corresponding user 120. Further, the functions can be distributed among the modules in a different manner than described in FIG. 1.

In one embodiment, the social networking system 100 includes a content push module 160. The social networking system 100 generates a set of news feed stories 140 (also referred to herein as stories.) The client device 110 comprises a news feed story 150 that is a subset of the set of news feed stories 140. The content push module 160 selects news feed stories, from the set of news feed stories 140 based on various criteria to push to the client device, which are further described in FIG. 3 through FIG. 5. In the example illustrated in FIG. 1, only one pushed news feed story is illustrated (i.e., news feed story 150); in other embodiments, the content push module 160 pushes two or more news feed stories from the set of news feed stories 140 to the client device 110. The social networking system 100 provides news feed stories to the device 110 before the user 120 actively requests stories from the social networking system 100 (e.g., by interacting with a smart phone client device). The stories pushed to the client device 110 are presented to the user 120 while other stories are fetched from the social networking system 100 in the background. In one embodiment, criteria for selecting stories to push include news feed ranking scores of the stories as well as other criteria different from the criteria used for ranking news feed stories.

The social networking system 100 offers its users the ability to communicate and interact with other users of the social networking system 100. Users join the social networking system 100 and then add connections to a number of other users of the social networking system 100 to whom they desire to be connected. As used herein, the term "friend" refers to any other user to whom a user has formed a connection, association, or relationship via the social networking system 100. The term friend need not require the users to actually be friends in real life, (which would generally be the case when one of the members is a business or other entity); it simply implies a connection in the social networking system 100.

The interactions between client devices 110 and the social networking system 100 are typically performed via a network 130, for example, via the internet. The network 130 enables communications between the device 110 and the social networking system 100. In one embodiment, the network 130 uses standard communications technologies and/or protocols. The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 130 can also include links to other networks such as the Internet.

Figure 2:
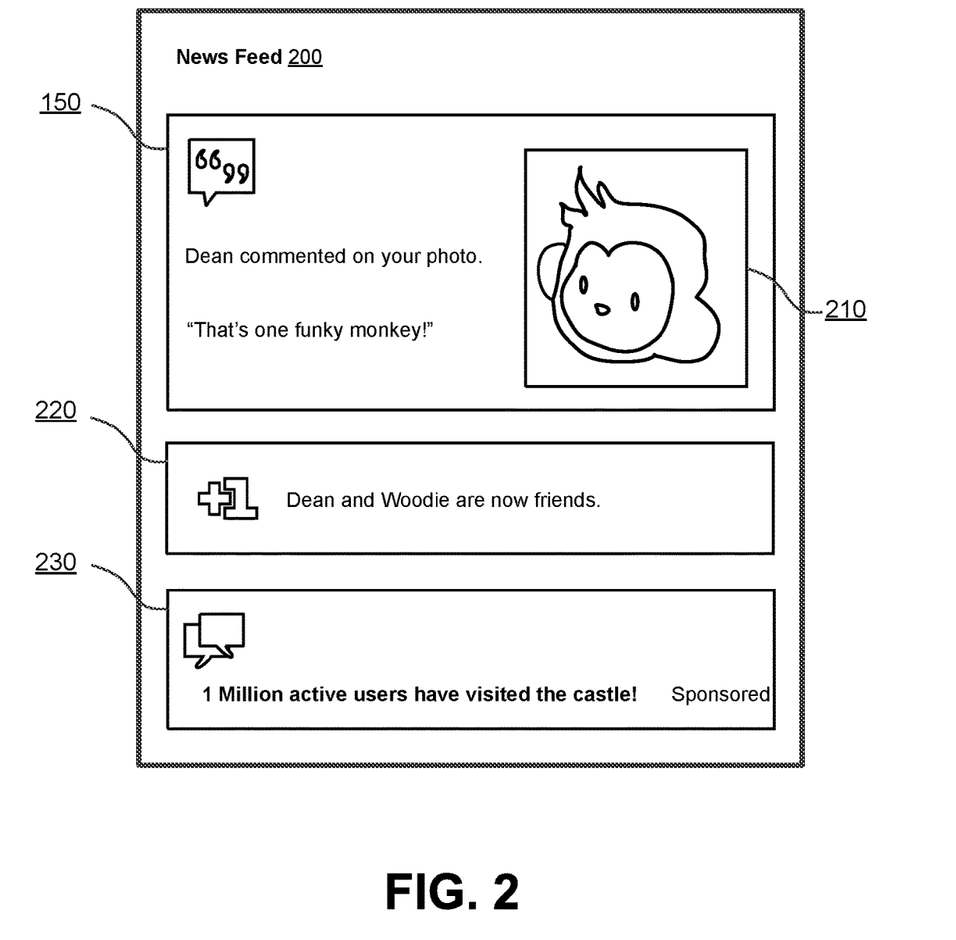
FIG. 2 shows news feed stories in a news feed of a social networking system according to one embodiment.

FIG. 2 shows news feed stories in a news feed 200 of a social networking system 100 according to one embodiment. In the example shown in FIG. 2, the news feed 200 includes a news feed story 150 with a photo 210, a news feed story 220 with text, and a news feed story 230 with sponsored content. The story 150 includes a photo 210 uploaded by a first user to the social networking system 100 and a comment (i.e., "That's one funky monkey!") about the photo 210 from a second user (i.e., "Dean") of the social networking system 100. In one embodiment, the content push module 160 pushes the story 150 to a client device 110 of the first user because the first user and the second user are connected as friends on the social networking system 100 and the system 100 received information from the first user indicating that the second user is a "close friend" of the first user. The first user is likely to interact with connections identified as "close friends" more often in comparison to other connections of the first user on the social networking system 100. Thus, the social networking system 100 determines that it is likely that the first user will read the story 150 because it has content, for example, a comment from a "close friend" of the first user. The story 220 indicates that the second user (i.e., "Dean") has become friends with another user (i.e., "Woodie") on the system 100. The sponsored content in story 230 is not specifically targeted to the first user, and describes information about a general population of user of the social networking system 100. Accordingly, the pushed story 150 is displayed at the top of the news feed 200 because the content push module 160 determines that the first user is more likely to read the story 150 than the story 220 and the story 230.

Social Networking System Architecture

Figure 3A:
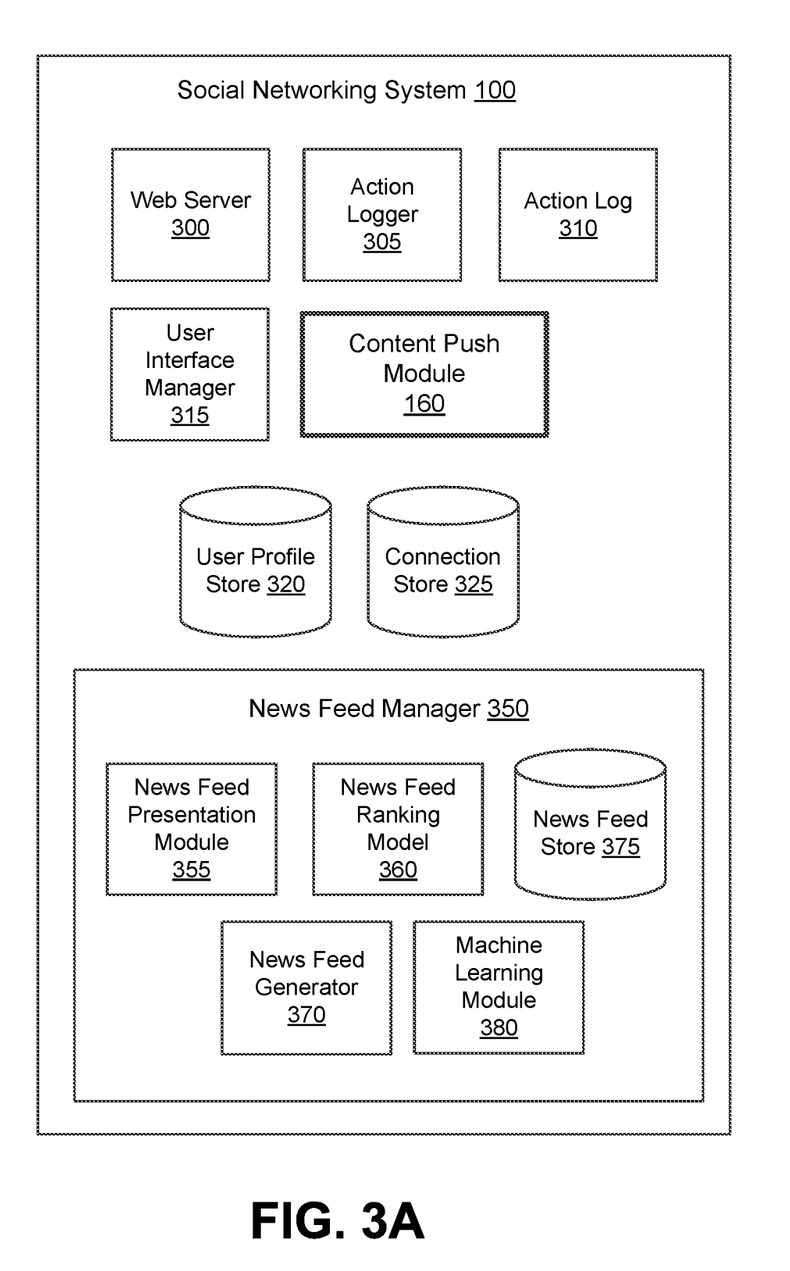
FIG. 3A is a block diagram of the system architecture of a social networking system according to one embodiment.

FIG. 3A is a block diagram of the system architecture of the social networking system 100 according to one embodiment. The social networking system 100 includes a web server 300, action logger 305, action log 310, user interface manager 315, user profile store 320, connection store 325, content push module 160, and news feed manager 350. In one embodiment, the news feed manager 350 includes a news feed presentation module 355, news feed ranking model 360, news feed generator 370, news feed store 375, and machine learning module 380. In other embodiments, the social networking system 100 and its modules may include additional, fewer, or different modules for various applications. Conventional components such as network interfaces, security mechanisms, load balancers, failover servers, management and network operations consoles, and the like are not shown so as to not obscure the details of the system.

The web server 300 connects the social networking system 100 via the network 130 to one or more client devices 110. The web server 300 provides the functionality of receiving and routing messages between the social networking system 100 and the client devices 110 as well as other external systems. These messages can be instant messages, queued messages (e.g., email), text and SMS (short message service) messages, or any other suitable messaging technique. In some embodiments, a message sent by a user to another can be viewed by other users of the social networking system 100, for example, by the connections of the user receiving the message. An example of a type of message that can be viewed by other users of the social networking system 100 besides the recipient of the message is a wall post. The web server 300 serves web pages, as well as other web-related content, such as Flash, XML, and so forth.

The action logger 305 receives communications from the web server 300 about user actions on and/or off the social networking system 100. The action logger 305 populates the action log 310 with information about user actions to track them. When a user 120 performs an action using the social networking system 100, action logger 305 adds an entry corresponding to that action to the action log 310. Any action that a particular user takes with respect to another user is associated with each user's profile, through information maintained in a database or other data repository, such as the action log 310. Example actions include adding a connection to the other user, sending a message to the other user, reading a message from the other user, viewing content associated with the other user, attending an event posted by another user, and the like. Further, a number of actions described below in connection with other objects are directed at particular users, so these actions are associated with those users as well.

The social networking system 100 allows users to communicate or otherwise interact with each other and access content. The social networking system 100 stores user profile objects in the user profile store 320. The information stored in user profile store 320 describes the users of the social networking system 100. Example information includes biographic and demographic information, as well as other types of descriptive information, e.g., age, work experience, educational history, interests, gender, sexual preferences, hobbies or preferences, location, income, languages spoken, ethnic background, and the like. Information describing a user may be explicitly provided by a user or may be inferred from actions of the user. For example, interests of a user can be inferred from the type of content accessed by the user. The user profile store 320 may store other types of information provided by the user, e.g., images, videos, documents, likes indicated by the user, comments, status updates, recommendations of images, videos, or uniform resource locator (URL) links, and the like. Images of users may be tagged with the identification information of the appropriate users displayed in an image.

The connection store 325 stores data describing the connections between different users of the social networking system 100. The connections are defined by users, allowing users to specify their relationships with other users. For example, the connections allow users to generate relationships with other users that parallel the users' real-life relationships, such as friends, co-workers, partners, and so forth. In some embodiment, the connection specifies a connection type based on the type of relationship, e.g., family, or friend, or colleague. Users may select from predefined types of connections, or define their own connection types as needed.

Connections may be added explicitly by a user, for example, the user selecting a particular other user to be a friend, or automatically created by the social networking system 100 based on common characteristics of the users (e.g., users who are alumni of the same educational institution). Connections in social networking system 100 are usually in both directions, but need not be, so the terms "connection" and "friend" depend on the frame of reference. For example, if Dean and Woodie are both connected to each other in the social networking system 100, Dean and Woodie, both users, are also each other's friends. The connection between users may be a direct connection; however, some embodiments of a social networking system 100 allow the connection to be indirect via one or more levels of connections. Connections may also be established between different types of entities for example, the social networking system 100 can have an object representing a school and users of the social networking system 100 that study in the school or who are alumni of the school can connect with the school in the social networking system 100.

In an embodiment, the news feed presentation module 335 determines the news feed stories to be presented to a user and provides the stories selected for presentation to the user interface manager 315. The user interface manager 315 presents the selected news feed stories to a user interface on a client device 110. The news feed presentation module 335 determines a set of stories for presentation to a viewer based on associations between the stories and the viewer. These associations are determined on various factors including, whether the story describes a user of the social networking system that is connected to the user, whether the viewer previously accessed information describing an entity represented in the social networking system that is described in the story, whether the viewer interacted with another story that is related to the current story, and the like. The news feed presentation module 335 invokes the news feed ranking model 360 to rank the news feed stories being presented to the user. The news feed presentation module 335 may present a subset of the stories based on the rank, for example, the top ten stories, depending on the display area available on the user interface for presenting the stories. The news feed presentation module 335 presents the stories in the order determined by the ranking, for example, stories ranked higher may be presented more prominently compared to stories ranked lower. In an embodiment, the stories ranked higher are presented above the stories ranked lower. In other embodiments, stories ranked higher may be presented more prominently by displaying them using an appropriate text color, font, text size, back ground color, etc.

The news feed generator 370 generates news feed stories for presentation to users 120 of the social networking system 100. The user to whom a story is presented is referred to as a viewer of the story. In an embodiment, the news feed generator 370 analyzes information stored in the action log 310 to identify information useful for generating news feed stories. In particular, the news feed generator 370 identifies actions stored in the action log 310 that are likely to be of interest to viewers and extracts information describing these actions from the action log 310 to generate stories. In some embodiments, the news feed generator 370 obtains information describing actions from other modules, for example, from the action logger 305, the user interface manager 315, or other run time modules that implement functionality for performing different types of actions. For example, if a user uploads an image to the social networking system 100, the module executing the code for uploading the image informs the news feed generator 370 of the action so that the news feed generator 370 can generate a news feed story describing the action.

The news feed generator 370 may determine that certain actions are not likely to be of interest to users for reporting as stories. For example, a user hiding a comment posted by another user or a user changing certain types of user preferences may not be of interest to other users and is therefore not reported in stories. However, other changes made by a user to the user's profile may be considered interesting for other users, for example, a change in relationship status of a user.

The news feed generator 370 may not generate news feed stories based on certain actions as a matter of policies enforced by the social networking system 100. For example, a user viewing user profile of another user or a user sending a private message to another user may not be presented as stories due to privacy concerns. Furthermore, the news feed generator 370 may consider privacy settings of individual users to determine whether certain actions of a user can be presented as stories to other users. A user may set the user's privacy settings to limit the set of people to whom stories describing the user's actions may be sent. For example, a user may allow only connections of the user to receive information describing the users' actions, whereas another user may allow connections of the user's connections to receive the information. A user may restrict the types of actions that are reported as stories. For example, the user may specify that certain actions, for example, adding a new connection may not be reported as a story.

In an embodiment, the news feed generator 370 stores the news feed stories generated in the news feed stories store 375. The news feed store 375 may be represented as a database that links various objects related to the stories. Each story stored in the news feed store 375 can be associated with other entities in the social networking system 100. For example, a news feed story may be associated with one or more users that performed an action described in the story in the social networking system 100. The users who performed the actions described in the news feed story are called the actors. For example, if the story describes a comment posted by Dean on a video posted by Woodie, both Dean and Woodie can be considered actors of the story. As another example, a story describing a comment posted by a user in response to another user's wall post may be associated with both the user who posted the message on the wall and the user who posted the comment.

The news feed ranking model 360, determines the news feed stories to be presented to a user and provides the stories selected for presentation to the user interface manager 315. The user interface manager 315 presents the selected news feed stories to a user interface on a client device 110. The news feed ranking model 360 determines a set of stories for presentation to a viewer based on associations between the stories and the viewer. These associations are determined on various factors including, whether the story describes a user of the social networking system that is connected to the user, whether the viewer previously accessed information describing an entity represented in the social networking system that is described in the story, whether the viewer interacted with another story that is related to the current story, and the like. In an embodiment, the news feed ranking model 360 determines a subset of the stories based on the rank, for example, the top ten stories, depending on the display area available on the user interface of the client device 110 for presenting the stories. The news feed ranking model 360 presents the stories in the order determined by the ranking, for example, stories ranked higher may be presented more prominently compared to stories ranked lower. In an embodiment, the stories ranked higher are presented above the stories ranked lower. In other embodiments, stories ranked higher may be presented more prominently by displaying them using an appropriate text color, font, text size, back ground color, etc.

The machine learning module 380 uses machine learning techniques to generate the news feed ranking model 360. The machine learning module 380 generates a portion of the functionality invoked by the news feed ranking model 360. For example, the machine learning module 380 generates a model that determines a ranking score associated with a given news feed story. The news feed ranking model 360 orders a set of stories based on the ranking scores of each story.

The machine learning module 380 uses various features for the news feed ranking model 360 including features describing the user 120 and features describing the story being analyzed. The machine learning module 380 uses features describing a connection type between the viewing user and a user associated with the story. The machine learning module 380 uses features indicating whether the story concerns an event currently occurring (or whether the event occurred in the past). The machine learning module 380 uses features describing a size of the content of the story, a measure of a network bandwidth of the client device, a measure of available memory on the client device, and so on.

The machine learning module 380 retrains the news feed ranking model 360 periodically. The machine learning module 380 uses stories previously pushed to the client device 110 as training data for the model. If the user 120 views a story the first time the story is presented to the client device 110, the machine learning module 380 marks the story as a favorable candidate for pushing in the training data set. If the story is viewed by the user 120 after being presented multiple times or never accessed by the user in spite of being presented multiple times, the machine learning module 380 marks the story as not being a good candidate for pushing to the client device 110.

In an embodiment, the machine learning module 380 generates a model that receives as input, individual stories, pairs of stories, or sets of stories. For example, the machine learning module 380 generates a classifier that takes as input a pair of news feed stories for a given user 120 and returns true if the first news feed story ranks higher than the second news feed story for reporting to the user and false otherwise. The news feed ranking model 360 can use the output of the generated classifier to rank a given set of news feed stories by doing pair wise comparisons of the ranking scores of the stories. Other embodiments use other machine learning techniques for ranking news feed stories, for example, tree-based models, kernel methods, neural networks, splines, or an ensemble of one or more of these techniques.

In some embodiments, the system 100 is not a social networking system but an online system 100 that communicates with a social networking system to obtain the necessary social network information. The online system 100 may communicate with the social networking system, for example, using application programming interfaces (APIs) provided by the social networking system. In these embodiments, some modules shown in FIG. 3A may run in the online system 100, whereas other modules may run in the remote social networking system. For example, the modules including the news feed ranking model 360 may run in the online system 100 but modules such as the action log 310, user profile store 320, and connection store 325 may exist in a separate social networking system.

Pushing News Feed Stories

Figure 3B:
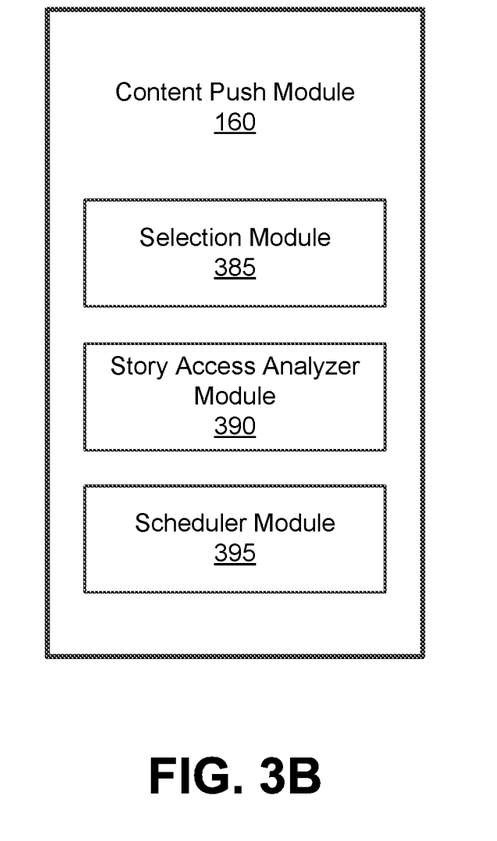
FIG. 3B is a block diagram of the system architecture of a content push module of a social networking system according to one embodiment.

FIG. 3B is a block diagram of the system architecture of a content push module 160 within the social networking system 100 according to one embodiment. In the embodiment illustrated in FIG. 3B, the content push module 160 includes a selection module 385, story access analyzer module 390, and scheduler module 395.

In one embodiment, the selection module 385 selects stories from the news feed store 375 and/or stories generated by the news feed generator 370 to push from the system 100 to the client device 110 based on different criteria. For example, the social networking system 100 receives information from the client device 110 indicating an amount of available memory on the client device 110. The social networking system 100 also receives from the client device 110 a measure of strength of network or a measure of an amount of network bandwidth available for downloading data from the social networking system 100 to the client device 110. The selection module 385 selects one or more stories to push to the client device 110 such that the total memory size of the one or more stories does not exceed the amount of available memory and/or the amount of network bandwidth available. Accordingly, the selection module 385 may exclude a story that has a large size and requires large amount of memory to store even if the story is ranked higher than the stories that are selected for pushing.

Further, if there is a low amount of network bandwidth available, then the selection module 385 selects stories to push that are smaller in size. Accordingly, if the measure of network bandwidth is below a first threshold value, the selection module 385 selects stories that are below a second threshold value for pushing to the client device 110 and excludes larger stories that are above the second threshold value. This is so because downloading a large story (e.g., a story with multimedia content such as a video or a photo) requires more time before the story is ready to be viewed by the user 120, and may result in a poor user experience.

In another embodiment, the selection module 385 determines a measure of likelihood that a user 120 will view and/or interact with a story if the story is pushed to a client device 110 of the user 120. The selection module 385 uses the determined measure of likelihood as a criterion for selecting stories to push to the client device 110. For example, a user 120 may be connected to many other users of the social networking system. However, the user 120 does not typically interact with each user that the user is connected with and is more likely to view stories associated with particular users over other users. In one embodiment, the selection module 385 determines a likelihood (e.g., a score) that a user 120 will view and/or interact with a story based on a measure of affinity between the user 120 and another user associated with the story. The social networking system 100 may determine the measure of affinity between two users based on a rate of interactions between the two users, a measure based on timestamps of interactions between the two users (e.g., interactions that are more recent are weighed more heavily), types of interactions between the two users, and so on.

In one embodiment, the selection module 385 determines a likelihood (e.g., a score) that a user 120 will view a story based on the type of connection between the user and another user associated with the story. For example, the selection module 385 determines (e.g., using information from the connection store 325) that the likelihood of the user viewing a story associated with a family member (e.g., brother, sister, father, mother, cousin, uncle, aunt, etc.) or "close friend" of the user will be high. In one example, the social networking system 100 receives an indication from the user 120 that another user is a "close friend" by providing manual input of the indication via the client device 110. In another example, the selection module 385 determines which connections are "close friends" to the user 120 based on information from the action log 310 logged by the action logger 305. For instance, the selection module 385 determines that a user 120 is close friends with another user if the user and the other user frequently attend the same events (e.g., based on RSVPs to events on the social networking system), frequently message each other on the system 100, frequently interact with the same stories (e.g., posting a comment on a same photo), and the like. In an embodiment, the social networking system 100 determines that two users are close friends if the measure of affinity between the two users exceeds a given threshold. In one embodiment, the selection module 385 may use any combination of two or more criteria to select stories to push. Further, the selection module 385 may weigh one criterion more heavily than another criterion.

In one embodiment, the selection module 385 uses a utility score as a criterion for selecting stories to push to the client device. The selection module 385 determines a utility score of a story based on an expected value that a user 120 will gain from viewing the story. For instance, a "close friend" of a user uploads a photo of a dog park and a photo of a beach to the social networking system; the system generates a story including the photo of the dog park and another story including the photo of the beach. If profile information of the user (e.g., information from the user profile store 320) indicates that the user has an affinity to information relevant to a story, then the news feed manager 350 determines that the story has a greater expected value. In this instance, the news feed manager 350 determines that the profile information indicates that the user frequently likes or comments on stories including photos of dogs or pet stores. Accordingly, the news feed manager 350 determines that the story including the photo of the dog park will have a greater expected value for the user, e.g., the user learns about the dog park and may bring her dog to the dog park for walks, and thus a greater utility score than the utility score of the story including the photo of the beach. On the other hand, if the news feed manager 350 determines that the profile information of the user indicates that the user is a fan of surfing or volleyball, then the news feed manager 350 assigns a higher utility score to the story including the photo of the beach. For example, the user may learn about the beach after viewing and/or interacting with the story and may visit the beach to surf or play volleyball. In this case, the story including the photo of the dog park and the story including the photo of the beach are both associated with a close friend of the user, and thus have a high likelihood of being viewed by the user.

In addition to considering the likelihood of a story being viewed, the selection module 385 also uses the utility score criterion to augment the selection for determining which stories to push. If the story access analyzer module 390 determines that there is only enough memory (or network bandwidth) available on the client device 110 to push one of the two stories associated with the close friend, then the story access analyzer module 390 uses the utility score as a tie breaker to determine which one story to push.

In one embodiment, the story access analyzer module 390 analyzes interactions performed by users 120 of the social networking system 100 with the news feed stories (e.g., based on data from the action log 310 and/or logged by the action logger 305) to determine patterns and/or trends describing different types of interactions with stories (e.g., stories pushed to the client device 110 and stories downloaded normally to the client device). For example, the story access analyzer module 390 determines that a user 120 views stories for an average of 30 seconds per story between 8:30 am and 9:00 am on weekdays (e.g., because the user has spare time during bus rides to work in the mornings). In another example, the story access analyzer module 390 determines that a user views stories for an average of 3 seconds per story between 9:00 am and 5:00 pm on weekdays (e.g., because the user has limited time during work hours at the office to interact with the social networking system 100). In one embodiment, the story access analyzer module 390 divides news feed stories into different subsets based on their characteristics. For example, certain news feed stories include an image or video and other stories include a URL link. Stories describe comments posted by users on images or videos, likes indicated by users, sponsored content, live events (e.g., music concerts and sports games), and connections added by users (e.g., becoming friends with another user on the social networking system). Stories may also be characterized by keywords present in the story or a sentiment of the story determined by lexical analysis of the story. In an embodiment, the story access analyzer module 390 identifies different patterns and/or trends associated with different subsets of stories. For instance, the story access analyzer module 390 identifies a pattern and/or trend indicating that stories including information describing food are more likely to be viewed by a user during breakfast, lunch, and dinner times each day.

In another embodiment, the story access analyzer module 390 predicts a likelihood of a user 120 interacting with news feed stories (e.g., the probability that the user will view a pushed story) based on aggregated patterns and/or trends from a population of other users of the social networking system 100. The story access analyzer module 390 identifies patterns and/or trends based on historical patterns of users having particular demographic characteristics. The story access analyzer module 390 identifies sets of users having certain demographic attributes. The story access analyzer module 390 determines rates of access of stories by users belonging to the identified sets of users at different times of the day (or during other periodic time intervals). The story access analyzer module 390 selects time intervals for which the access rate of pushed stories by the users of a particular subset is higher than access rates during other time intervals or higher than a particular threshold value.

For instance, the story access analyzer module 390 may identify a pattern and/or trend that teenage users, e.g., users in an age range of 13-18 years old, typically view stories pushed to client devices of the users (and/or stories downloaded regularly to the client devices) in the time range of 3-5 PM on weekdays because teenagers usually finish school around 3 PM on weekdays, and thus have free time after 3 PM to interact on the social networking system via their client devices. The story access analyzer module 390 provides the pattern and/or trend describing interactions of teenage users to the selection module 395. As a result, the selection module 395 determines greater probabilities that other teenage users of the social networking system will view stories pushed in the 3-5 PM weekday time range and greater utility scores for candidate stories to be pushed to users in the time range. In some embodiments, the story access analyzer module 390 stores identified patterns and/or trends in the user profile store 320 and/or any other database of the social networking system.

The scheduler module 395 schedules delivery of stories selected to be pushed to the client device 110. In one embodiment, the scheduler module 395 schedules delivery based on the patterns and/or trends identified by the story access analyzer module 390. For instance, if an identified pattern and/or trend indicates that a user frequently views stories and/or pushed stories to a client device of the user during the evenings around 7 PM, then the scheduler module 395 schedules selected push stories to be downloaded to the client device around 7 PM because the user is most likely to view the pushed stories during the time period around 7 PM. In another example, an identified pattern and/or trend indicates that a user rarely views stories or interacts with the social networking system 100 before noon each day. Accordingly, the scheduler module 395 avoids scheduling stories to be pushed to a client device of the user before noon because the user is unlikely to view the pushed stories during the morning. In an embodiment, the scheduler module 395 generates a recurring schedule such as pushing stories on a daily or weekly basis at the same time each day or week. In other embodiments, the scheduler module 395 generates a one-time scheduled delivery of pushed stories. In one embodiment, the scheduler module 395 schedules delivery based on patterns and/or trends describing network connections of client devices. For example, a pattern and/or trend indicates that client devices have slow download speeds between 7-8 PM because there is a large amount of network traffic during this time period (e.g., many users of the social networking system are viewing stories on their client devices during a peak hour). Thus, the scheduler module 395 performs load balancing by staggering the scheduled delivery times of pushed stories to avoid contributing to slow download speeds, which would result in a poor user experience (i.e., users have to wait longer for stories to download to their client devices).

Process Flow

Figure 4:
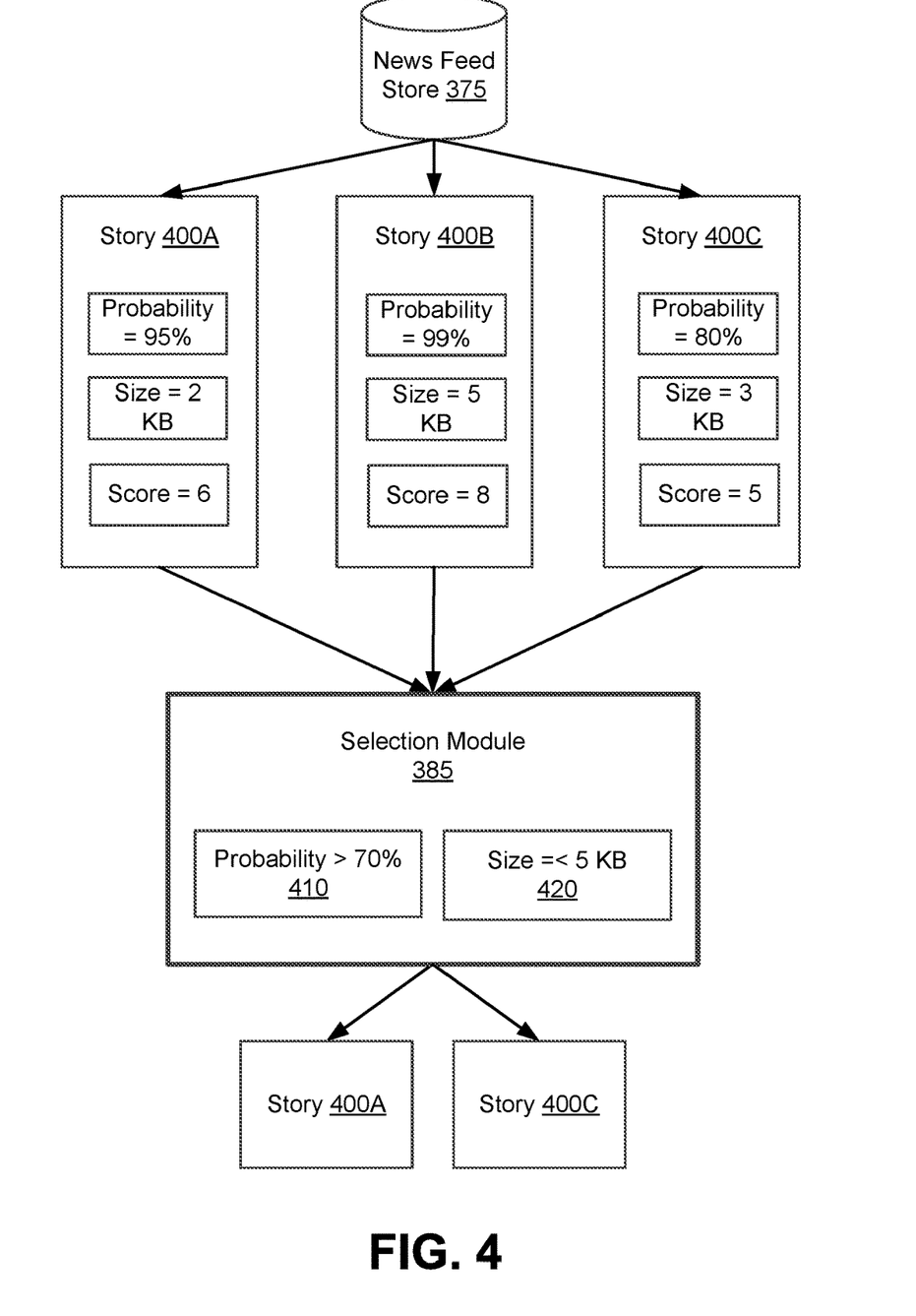
FIG. 4 is a data flow diagram illustrating selection of news feed stories for being pushed to client devices according to one embodiment.

FIG. 4 is a data flow diagram illustrating selection of news feed stories for being pushed to client devices according to one embodiment. In the embodiment shown in FIG. 4, the selection module 385 retrieves one or more stories, for example, story 400A, story 400B, and story 400C from the news feed store 375. The selection module 385 determines a measure of size of each story indicating of amount of memory required for storing the story, for example, 2 KB, 5 KB, and 3 KB for story 400A, story 400B, and story 400C, respectively. Further, the selection module 385 associates each story with a likelihood or probability (i.e., 95%, 99%, and 80% for story 400A, story 400B, and story 400C, respectively) of being viewed by a user. The selection module 385 determines a utility score for each story (i.e., 6, 8, and 5 for story 400A, story 400B, and story 400C, respectively).

A story may have a previously determined value of probability (i.e., likelihood of being viewed and/or interacted with by the user 120) and/or utility score. The selection module 385 stores the previously determined values, e.g., in the news feed store 375. In these situations, the selection module 385 accesses the previously stored values. If a story does not have a previously determined probability and/or utility score, the selection module 385 determines the probability and/or utility score of the story once the story is retrieved from the news feed store 375. The selection module 385 executes one or more rules configured to determine whether a story should be pushed to a client device 110. FIG. 4 shows two rules, rule 410 ("probability>70%") and rule 420 ("size=<5 KB"). The rule 410 indicates a minimum threshold value for the probabilities (i.e., likelihood of being viewed by a user) of stories selected to be pushed, i.e., the selection module 385 selects stories to push if the probability that the story will be viewed by the user 120 is greater than a threshold value, for example, 70%. In other embodiments, the threshold probability can be any other predetermined value or a value dynamically determined by the selection module 385 based on information associated with a user 120. For instance, the threshold may be adjusted based on an aggregate value, for example, an average probability of a plurality of stories previously pushed to a client device 110 of a user 120. In one example, a first user has a corresponding average probability of previously pushed stories greater than a second user's corresponding average probability of previously pushed stories. Accordingly, the first user's threshold probability is greater than the second user's threshold probability because the selection module 385 limits the number of stories to be pushed, i.e., a threshold that is too high results in not enough stories being pushed and a threshold that is too low results in too many stories being pushed. Not pushing enough stories is undesirable because the user 120 will have to wait for stories to download, rather than having stories already downloaded (i.e., pushed stories) and ready to view immediately when the user interacts with the social networking system 100 via a client device 110. Pushing too many stories may also be undesirable because downloading (i.e., pushing) stories to a client device 110 consumes local memory storage on the client device and network bandwidth.

In one embodiment, the social networking system 100 receives information describing a cost associated with the transfer of data to the client device 110. For example, a user 120 may have a data plan that limits the amount of network bandwidth that the client device 110 can consume over a period of time (e.g., before accruing a penalty fee). The content push module 160 determines a rate at which the content push module 160 pushes stories to the client device based on the data plan. Accordingly, the content push module 160 may stop pushing stories once a network bandwidth quota of the data plan has been reached or is within a threshold of the quota. In an embodiment, the social networking system 100 receives an indication of the quota from the user 120 via the client device 110. Alternatively, the social networking system 100 uses an application programming interface (API) of a provider of network services and/or phone services for the client device 110 to access information describing a quota of network bandwidth for the client device 110. In an embodiment, the social networking system 100 periodically accesses the API of the provider to determine a quota representing a remaining amount of network bandwidth for a particular period (for example, for the latest month). This is so because the network bandwidth may be consumed by other applications (e.g., a photo sharing application) and/or features of the client device 110 (e.g., receiving text messages). If the content push module 160 determines that the remaining quota for a particular time period has reduced below a threshold (for example, due to increased bandwidth consumption by other applications), the content push module 160 reduces the rate at which stories are pushed to the client device 110. The content push module 160 stops pushing stories to the client device 110 if the remaining bandwidth is below a particular threshold, to allow other applications to continue using the remaining bandwidth. If the content push module 160 determines that the remaining quota for a particular period is greater than expected (for example, if the usage of other applications is lower than expected), the content push module 160 increases the rate at which stories are pushed to the client device 110.

In an embodiment, the selection module 385 receives a set of news feed stories identified as candidate stories for pushing to the client device 110. For example, the selection module 385 receives scores of stories indicating a likelihood of the user 120 interacting with the stories and selects stories that have a score value greater than a threshold value. The selection module 385 determines a subset of stories from the set for pushing to the client device 110. The selection module 385 identifies subsets of stories that can be accommodated in the allocated amount of memory of the client device 110. In an embodiment, the selection module 385 selects an identified subset of stories that optimizes the aggregate score of stories in the subset. Accordingly, the selection module 385 may select a first subset of stories over a second subset even if the second subset includes one or more stories ranked higher than the stories in the first subset if the total score of the stories in the first subset is higher than the total score of the stories in the second subset. In another embodiment, the selection module 385 selects an identified subset of stories that optimizes the total number of stories in the subset. Accordingly, the selection module 385 prefers a first subset over a second subset if the first subset has more stories than the second subset.

As shown in FIG. 4, the rule 420 indicates an example available memory limit on the client device 110 for pushed stories. Accordingly, the selection module 385 enforces the rule 420 that ensures that the total size of pushed stories is within a threshold value, i.e., the total size of pushed stories must be equal to or less than 5 KB. In other embodiments, the available memory limit is any other predetermined value based on information about the client device 110, and the available memory limit changes dynamically over time as more or less memory becomes available on the client device 110 depending on the memory consumption of other applications executing on the client device 110. Based on rule 410, the selection module 385 selects story 400B as the first story to be pushed because story 400B has the greatest probability of being viewed by the user. In some embodiments, the selection module 385 optimizes for total utility score, i.e., the selection module 385 selects stories to be pushed such that the sum of the utility scores of the selected stories is optimized. In this example considering both rule 410 and rule 420, pushing story 400B corresponds to a total utility score of 8 (i.e., the score of story 400B) because story 400B is the only story that can be pushed due to the size constraint of rule 420. In particular, story 400B is 5 KB, which equals the available memory limit of 5 KB. However, if story 400A and story 400C were pushed instead, then the total utility score would be 11 (i.e., sum of score of 6 of story 400A and score of 5 of story 400C), which is greater than the total utility score of 8, corresponding to the scenario of pushing story 400B only. Since the sum of the sizes of story 400A and story 400C satisfies the size constraint (i.e., sum of 2 KB size of story 400A and 3 KB size of story 400C is equal to the available memory limit of 5 KB), both story 400A and story 400C can be pushed to the client device 110. Thus, the selection module 385 selects both story 400A and story 400C for pushing to the client device instead of pushing only story 400B.

In other embodiments, the selection module 385 generates other types of rules used to select stories to push to the client device. For example, the selection module 385 generates a rule indicating that stories including information associated with live events (e.g., a story about a sports game that is currently being played) will always be pushed because a user has a high likelihood of viewing a story with information about a live event. In some embodiments, the selection module 385 determines that an event associated with a story is a live event based on information accessed using an API of an external source (e.g., a third-party application) and/or information retrieved from the internet via the network 130 (e.g., online news websites). In an embodiment, the selection module 385 determines the live event based on analysis of content of the story with information about the live event, e.g., a linguistic analysis indicates that the content includes text corresponding to the current date and or time range of day (e.g., "I am at the basketball game right now!" or "Concert on Apr. 1, 2016"). In another example, the selection module 385 generates a rule indicating that stories originating from other users who are located within a certain geographical distance from a user will always be pushed to the user because the user is likely interested in stories originating from the user's local area, e.g., the college campus of the user.

Figure 5:
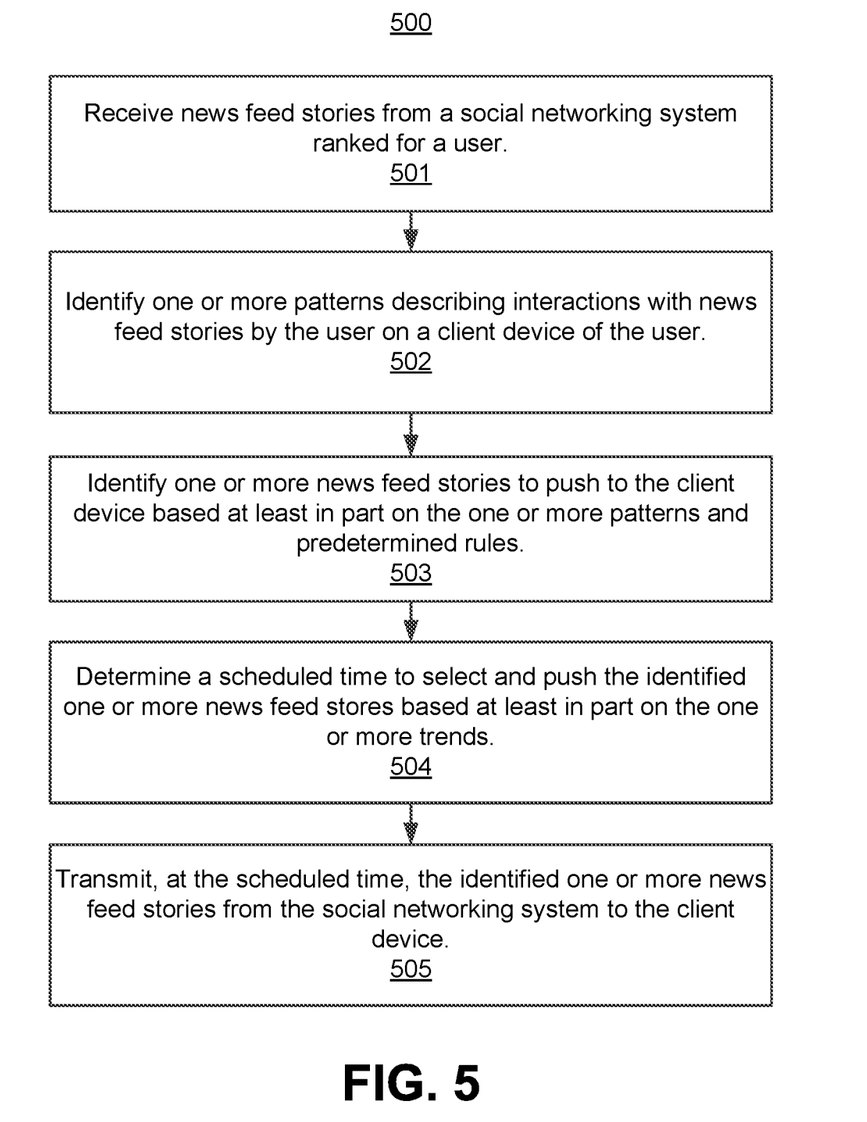
FIG. 5 is a flowchart of the process of pushing news feed stories to client devices according to one embodiment.

FIG. 5 is a flowchart of the process 500 of pushing news feed stories to client devices according to one embodiment. In some embodiments, the social networking system 100 uses the process 500 within the environment of FIG. 1. The process 500 may include different or additional steps than those described in conjunction with FIG. 5 in some embodiments or perform steps in different orders than the order described in conjunction with FIG. 5.

A social networking system 100 initially receives 501 news feed stories of the social networking system 100 ranked for a user 120 (e.g., stories from the news feed generator 370 and/or new feed store 375). In an embodiment, the stories are previously ranked by the news feed ranking model 360 trained by the machine learning module 380. The social networking system 100 (e.g., the story access analyzer module 390) identifies 502 one or more patterns describing interactions with news feed stories performed by the user 120 on a client device 110 of the user (e.g., based on data logged by the action logger 305 and/or data stored in the action log 310). In some embodiments, the news feeds stories include stories pushed (e.g., by the content push module 160) to the client device 110 and/or other stories downloaded from the server to the client device (e.g., downloaded when the user actively requests additional stories from the social networking system). For example, a pattern indicates that a user 120 typically views pushed stories at specific time intervals that occurs periodically (every day or during a particular day of the week), for example, between 10 PM and midnight on weekends. The social networking system 100 (e.g., the selection module 385) identifies 503 one or more news feed stories to push to the client device based at least in part on the one or more patterns and predetermined rules. In an embodiment, the predetermined rules are based on criteria including the probability that the user will view a pushed story, the total size of pushed stories, and/or a utility score of a pushed story (e.g., the expected value of information gained by the user by viewing the pushed story). The system 100 (e.g., the scheduler module 395) determines 504 a scheduled time to select and push the identified one or more news feed stories based at least in part on the one or more patterns. The content push module 160 identifies a time interval with a high likelihood of the user 120 accessing the one or more stories. In an embodiment, the content push module 160 executes the process of selecting the one or more stories for pushing to the client device and pushing them to the client device within a threshold time interval before the identified time window. Selecting the set of one or more stories for pushing too far in advance of the actual delivery of the stories increases the chances that other stories may become generated that are better candidates than the selected set of stories (e.g., compared to the selected set of stories, the other stories have a higher likelihood of being viewed by the user). Accordingly, the set of stories selected for pushing may become a suboptimal set of stories by the time the stories are delivered to the client device 110. Furthermore, pushing the one or more stories to the client device 110 too far in advance of the identified time interval causes resources (for example, memory or network bandwidth) of the client device 110 to be consumed for a longer time interval than necessary. The content push module 160 pushes the one or more stories closer to the time interval when the user 120 is likely to view and/or interact with the stories, thereby freeing up the resources (for example, memory or network bandwidth) of the client device 110 for use by other applications executing on the client device 110. At the scheduled time, the social networking system 100 (e.g., the content push module 160 via the user interface manager 315) transmits 505 the identified one or more news feed stories (i.e., the selected set of stories) from the social networking system 100 to the client device 110 for display to the user 120 (e.g., in the news feed 200 shown in FIG. 2).

In an embodiment, the social networking system 100 receives information from the client device 110 indicating whether the user 120 interacted with (or viewed) a story pushed to the client device 110. The social networking system 100 receives an indication if the user did not interact with the story in spite of the story being presented more than a threshold number of times and/or an indication that the user has not interacted with a story pushed to the client device for more than a threshold period of time. The selection module 385 uses these indications to determine whether to mark these stories for deletion. Accordingly, the selection module 385 identifies one or more stories for deletion if the stories were pushed to the client device but not accessed by the user after being presented more than a threshold time or after being stored on the client device for more than a threshold period of time. The content push module 160 treats these stories as deleted and determines the available memory for selecting a new set of stories to push assuming these stories as deleted. The content push module 160 sends information to the client device 110 indicating that the identified stories may be deleted from the client device to reclaim the memory used by the identified stories.

In an embodiment, the machine learning module 380 determines the training data set of retraining the news feed ranking model 360 based on the information indicating whether a story pushed to the user 120 is read by the user or is marked for deletion. For example, a currently trained news feed ranking model 360 may identify a particular story as a good candidate for pushing to the client device 110. However, if the social networking system 100 receives indication that the story was not accessed by the user, the machine learning module 380 includes the story in a training data set identifying stories that are not good candidates for pushing to the client device. Over time, the news feed ranking model 360 is retrained and recalculates weights of features and/or characteristics of stories that should or should not be pushed to the client device.

Alternative Embodiments

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a nontransitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   identifying a plurality of news feed stories from a social networking system for a user of the social networking system;
   determining a score for each of the plurality of news feed stories, the score representing a likelihood of the user accessing the news feed story responsive to the social networking system presenting information describing the news feed story to the user via a client device;
   determining a measure of a size of each of the plurality of news feed stories;
   receiving a measure of an amount of memory allocated at the client device for storing news feed stories received from the social networking system;
   selecting a subset of the plurality of news feed stories for transmitting to the client device based at least in part on the aggregate scores of the selected subset, the selected subset having an aggregate size below the amount of memory allocated at the client device;
   determining a time interval based on patterns of past interactions of the user with news feed stories presented by the social networking to the client device; and
   transmitting, by the social networking system based on the time interval, the subset of news feed stories to the client device in advance of receiving a request from the client device for accessing stories from the social networking system.

2. The method of claim 1, wherein the subset of stories is transmitted to the client device within a threshold period of time before the time interval.

3. The method of claim 1, wherein the subset of stories is selected within a threshold period of time before the identified time interval.

4. The method of claim 1, wherein the time interval corresponds to a time period of a day during which the user accesses, via the client device, news feed stories of the social networking system at a rate higher than the access rates for other time periods of the day.

5. The method of claim 1, wherein the time interval is further determined based on a strength of network connection of the client device.

6. The method of claim 1, further comprising:
   receiving a value of a quota for the client device, the quota representing a remaining amount of network bandwidth for a particular period; and
   adjusting a rate at which news feed stories are determined and transmitted by the social networking system to the client device based on the value of the quota.

7. The method of claim 1, further comprising:
   receiving information indicating whether the user interacted with a story of the subset of news feed stories transmitted to the client device; and
   responsive to determining that the user did not interact with the story for more than a threshold time interval, sending a request to the client device to reclaim memory allocated for the story.

8. The method of claim 1, wherein selecting the subset of the plurality of stories for transmitting to the client device is further based on maximizing the aggregate score of the subset compared to other subsets of the plurality of news feed stories.

9. The method of claim 1, wherein selecting the subset of the plurality of stories for transmitting to the client device is further based on the score of each story of the subset being greater than a threshold score, the threshold score based at least in part on a rate at which the user accessed subsets of news feed stories previously transmitted to the client device.

10. A non-transitory computer-readable storage medium storing executable computer program instructions, the computer program instructions comprising code for:
    identifying a plurality of news feed stories from a social networking system for a user of the social networking system;
    determining a score for each of the plurality of news feed stories, the score representing a likelihood of the user accessing the news feed story responsive to the social networking system presenting information describing the news feed story to the user via a client device;
    determining a measure of a size of each of the plurality of news feed stories;
    receiving a measure of an amount of memory allocated at the client device for storing news feed stories received from the social networking system;
    selecting a subset of the plurality of news feed stories for transmitting to the client device based at least in part on the aggregate scores of the selected subset, the selected subset having an aggregate size below the amount of memory allocated at the client device;
    determining a time interval based on patterns of past interactions of the user with news feed stories presented by the social networking to the client device; and
    transmitting, by the social networking system based on the time interval, the subset of news feed stories to the client device in advance of receiving a request from the client device for accessing stories from the social networking system.

11. The non-transitory computer-readable storage medium of claim 10, wherein the subset of stories is transmitted to the client device within a threshold period of time before the time interval.

12. The non-transitory computer-readable storage medium of claim 10, wherein the subset of stories is selected within a threshold period of time before the identified time interval.

13. The non-transitory computer-readable storage medium of claim 10, wherein the time interval corresponds to a time period of a day during which the user accesses, via the client device, news feed stories of the social networking system at a rate higher than the access rates for other time periods of the day.

14. The non-transitory computer-readable storage medium of claim 10, wherein the time interval is further determined based on a strength of network connection of the client device.

15. The non-transitory computer-readable storage medium of claim 10, wherein the computer program instructions further comprise code for:
    receiving a value of a quota for the client device, the quota representing a remaining amount of network bandwidth for a particular period; and
    adjusting a rate at which news feed stories are determined and transmitted by the social networking system to the client device based on the value of the quota.

16. The non-transitory computer-readable storage medium of claim 10, wherein the computer program instructions further comprise code for:
   receiving information indicating whether the user interacted with a story of the subset of news feed stories transmitted to the client device; and
   responsive to determining that the user did not interact with the story for more than a threshold time interval, sending a request to the client device to reclaim memory allocated for the story.

17. The non-transitory computer-readable storage medium of claim 10, wherein selecting the subset of the plurality of stories for transmitting to the client device is further based on maximizing the aggregate score of the subset compared to other subsets of the plurality of news feed stories.

18. The non-transitory computer-readable storage medium of claim 10, wherein selecting the subset of the plurality of stories for transmitting to the client device is further based on the score of each story of the subset being greater than a threshold score, the threshold score based at least in part on a rate at which the user accessed subsets of news feed stories previously transmitted to the client device.

* * * * *